(12) United States Patent
Wu et al.

(10) Patent No.: US 6,293,097 B1
(45) Date of Patent: Sep. 25, 2001

(54) ON-BOARD REDUCTANT DELIVERY SYSTEM

(75) Inventors: Ching-Hsong Wu, Farmington Hills; Robert Henry Hammerle, Franklin, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/375,221

(22) Filed: Aug. 16, 1999

(51) Int. Cl.[7] .......................................................... F01N 3/00
(52) U.S. Cl. .................................. 60/286; 60/307; 417/38
(58) Field of Search .......................... 60/286, 307; 417/38

(56) References Cited

U.S. PATENT DOCUMENTS

| | | | |
|---|---|---|---|
| 4,547,128 | * 10/1985 | Hayes | 417/38 |
| 4,728,264 | 3/1988 | Tuckey . | |
| 4,728,869 | 3/1988 | Johnson et al. . | |
| 5,220,941 | 6/1993 | Tuckey . | |
| 5,265,644 | 11/1993 | Tuckey . | |
| 5,369,956 | * 12/1994 | Daudel et al. | 60/286 |
| 5,406,922 | 4/1995 | Tuckey . | |
| 5,412,946 | * 5/1995 | Oshima et al. | 60/286 |
| 5,522,218 | * 6/1996 | Lane et al. | 60/286 |
| 5,605,042 | 2/1997 | Stutzenberger | 60/301 |
| 5,606,856 | * 3/1997 | Linder et al. | 60/286 |
| 5,628,186 | * 5/1997 | Schmelz | 60/286 |
| 5,753,188 | * 5/1998 | Shimoda et al. | 60/286 |
| 5,884,475 | * 3/1999 | Hofmann et al. | 60/274 |
| 5,943,858 | 8/1999 | Hofmann et al. | 60/303 |
| 6,041,594 | * 3/2000 | Brenner et al. | 60/286 |

FOREIGN PATENT DOCUMENTS

| | | |
|---|---|---|
| 0 555 746 A1 | 2/1993 | (DE) . |
| 0 849 443 A1 | 10/1997 | (DE) . |
| 0 654 773 A 1 | 5/1995 | (EP) . |
| 4-208087 | 7/1992 | (JP) . |
| 8-284842 | 10/1996 | (JP) . |

* cited by examiner

Primary Examiner—Thomas Denion
Assistant Examiner—Thai-Ba Trieu
(74) Attorney, Agent, or Firm—Damian Porcari

(57) ABSTRACT

An on-board reductant delivery system for a motor vehicle includes a mixer/nozzle system for connection to an exhaust system of a motor vehicle. The on-board reductant delivery system also includes a fluid metering system connected to the mixer/nozzle system for metering reductants to the mixer/nozzle system. The on-board reductant delivery system further includes an air supply system connected to the mixer/nozzle system for delivering pressurized air to the mixer/nozzle system. The mixer/nozzle system mixes the reductants and pressurized air and sprays the mixture in the exhaust system of the motor vehicle to reduce NOx.

19 Claims, 3 Drawing Sheets

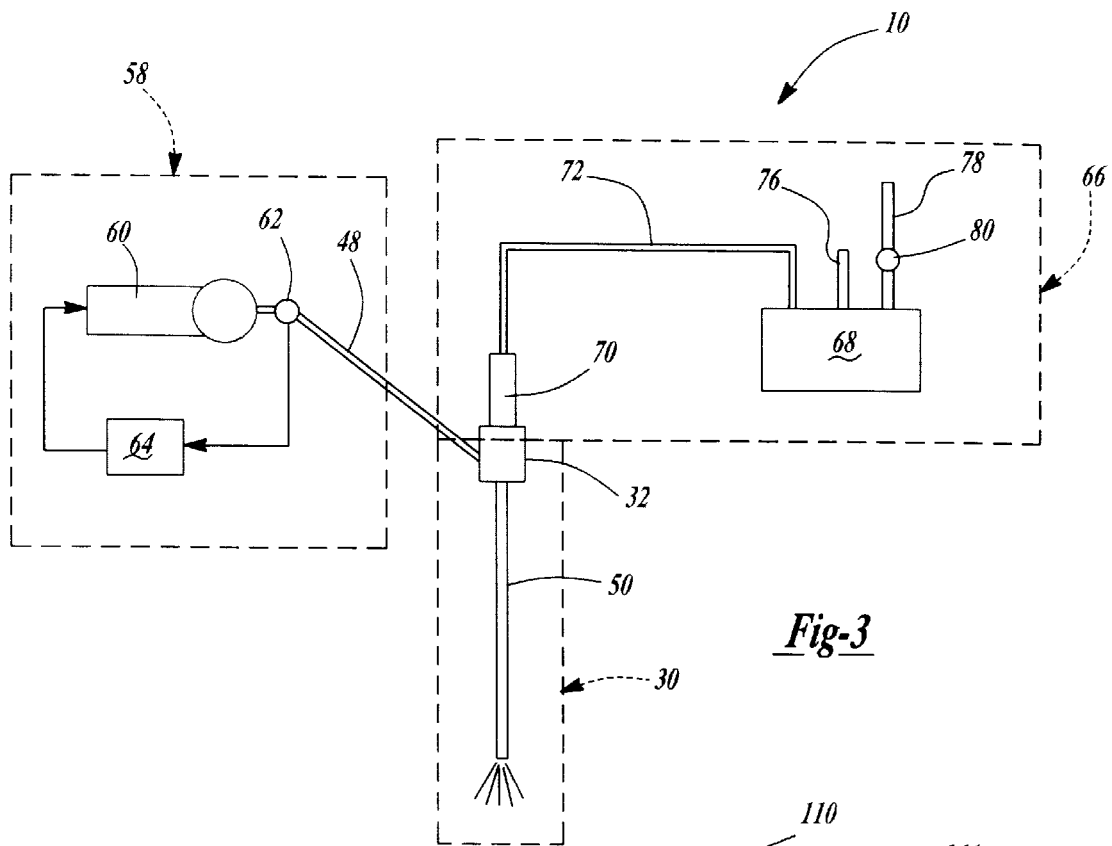
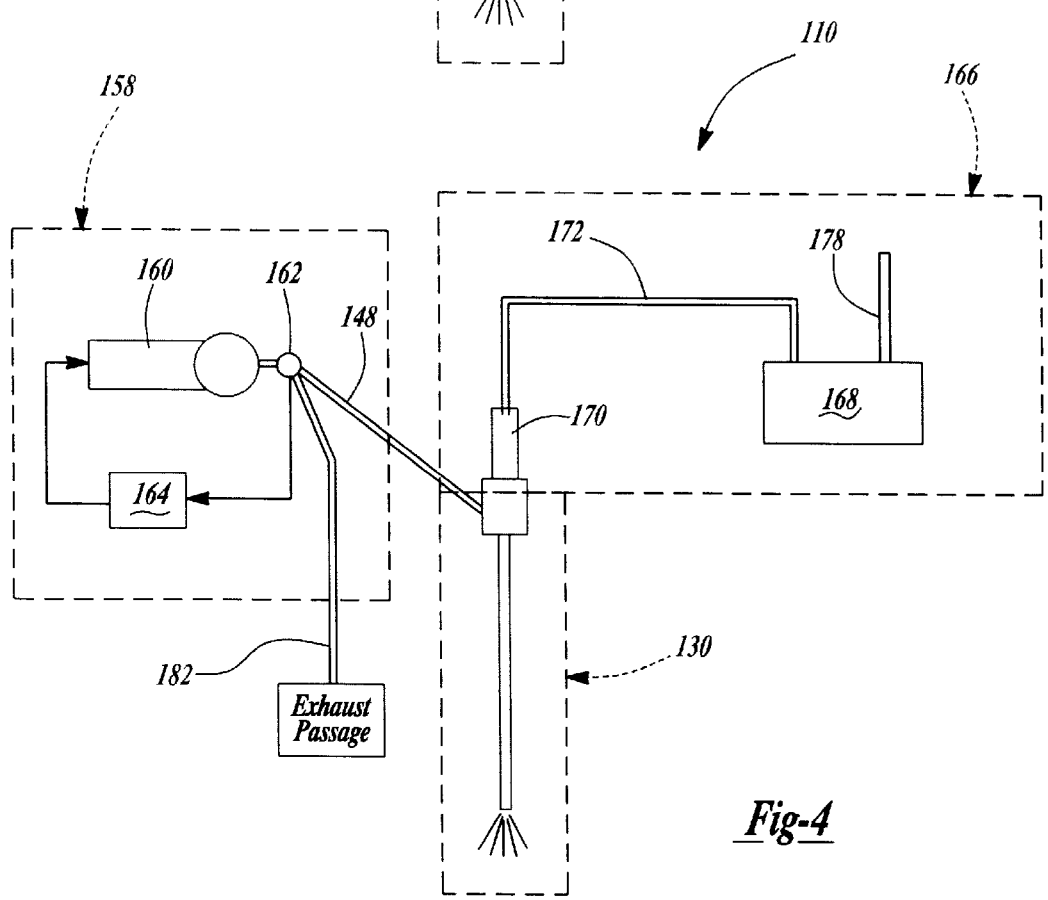

ON-BOARD REDUCTANT DELIVERY SYSTEM

BACKGROUND OF THE INVENTION

1. Field of the Invention

The present invention relates generally to exhaust systems for motor vehicles and, more specifically, to an on-board reductant delivery system for an exhaust system of a motor vehicle.

2. Description of the Related Art

Exhaust systems for motor vehicles are known. Typically, the exhaust system includes an exhaust manifold connected to an engine of the motor vehicle and a close coupled catalyst connected via an exhaust pipe to the exhaust manifold. The exhaust system also includes an underbody catalyst connected via the exhaust pipe to the close coupled catalyst and a tail pipe connected to the underbody catalyst.

Lean NOx catalysts (LNC) and selective catalytic reduction catalysts (SCR) are known to reduce NOx emissions from diesel and lean-burn gasoline engines. In order to promote NOx reduction under oxidizing environments, certain reductants such as hydrocarbon (HC) fuels and/or urea solution or other ammonia (NH3) containing compounds must be added. To function effectively, the conditions for adding these reducing compounds to the exhaust system are critical. Specifically, the injected quantity must precisely match the NOx concentration in order to obtain maximum conversion and to avoid HC and/or NH3 slippage. Also, the response time must be fast to deal with the sudden increase of NOx during acceleration. Further, the fluid droplet size must be very fine and well distributed across catalyst surfaces to achieve high NOx conversion efficiencies. In addition, the system must be compact, light-weight, cost and energy efficient.

One known reductant delivery system uses a solenoid valve to meter diesel fuel, which was then dripped into the exhaust pipe. Another known reductant delivery system includes an injection system using a large fuel pump with a pressure regulator, a return line and an injector to meter and inject fuel into the exhaust. Yet another known reductant delivery system used a fuel pump, a fuel injector and an air assisted spray system. However, these systems are either slow, less effective in fluid dispersion, cumbersome, heavy, costly, noisy or high energy consumption.

Although the above reductant delivery systems have worked, it is desirable to improve NOx conversion efficiencies of selected catalysts under oxidizing conditions by delivering precise amount of reductants with fast response time and good distribution. It is also desirable to provide a low cost, robust reductant delivery system to control NOx emissions of vehicles equipped with lean NOx catalyst and/or selective catalytic reduction catalysts. It is further desirable to provide a compact, lightweight, energy efficient and potentially durable reductant delivery system for on-board vehicle application. Therefore, there is a need in the art to provide an on-board reductant delivery system for a motor vehicle.

SUMMARY OF THE INVENTION

Accordingly, the present invention is an on-board reductant delivery system for a motor vehicle. The on-board reductant delivery system includes a mixer/nozzle system for connection to an exhaust system of a motor vehicle. The on-board reductant delivery system also includes a fluid metering system connected to the mixer/nozzle system for metering reductants to the mixer/nozzle system. The on-board reductant delivery system further includes an air supply system connected to the mixer/nozzle system for delivering pressurized air to the mixer/nozzle system. The mixer/nozzle system mixes the reductants and pressurized air and sprays the mixture in the exhaust system of the motor vehicle to reduce NOx.

One advantage of the present invention is that an on-board reductant delivery system is provided for a motor vehicle. Another advantage of the present invention is that the on-board reductant delivery system is compact and efficient to disperse controlled quantity of reductants for vehicles equipped with active lean NOx catalysts and/or selective catalytic conversion catalysts. Yet another advantage of the present invention is that the on-board reductant delivery system improves NOx conversion efficiencies of selected catalysts under oxidizing conditions by delivering precise amount of reductants with fast response time and good distribution. Still another advantage of the present invention is that the on-board reductant delivery system is compact, lightweight, energy efficient, low-cost, quiet and potentially durable for on-board vehicle application. A further advantage of the present invention is that the on-board reductant delivery system is able to maintain constant pressure drop across nozzle to assure good atomization.

Other features and advantages of the present invention will be readily appreciated, as the same becomes better understood after reading the subsequent description taken in conjunction with the accompanying drawings.

BRIEF DESCRIPTION OF THE DRAWINGS

FIG. I is a plan view of an on-board reductant delivery system, according to the present invention, illustrated in operational relationship with a motor vehicle.

FIG. 3 is a diagrammatic view of the on-board reductant delivery system of FIG. 1.

FIG. 4 is a diagrammatic view of another embodiment, according to the present invention, of the on-board reductant delivery system of FIG. 1.

DESCRIPTION OF THE PREFERRED EMBODIMENT(S)

Figure 1:
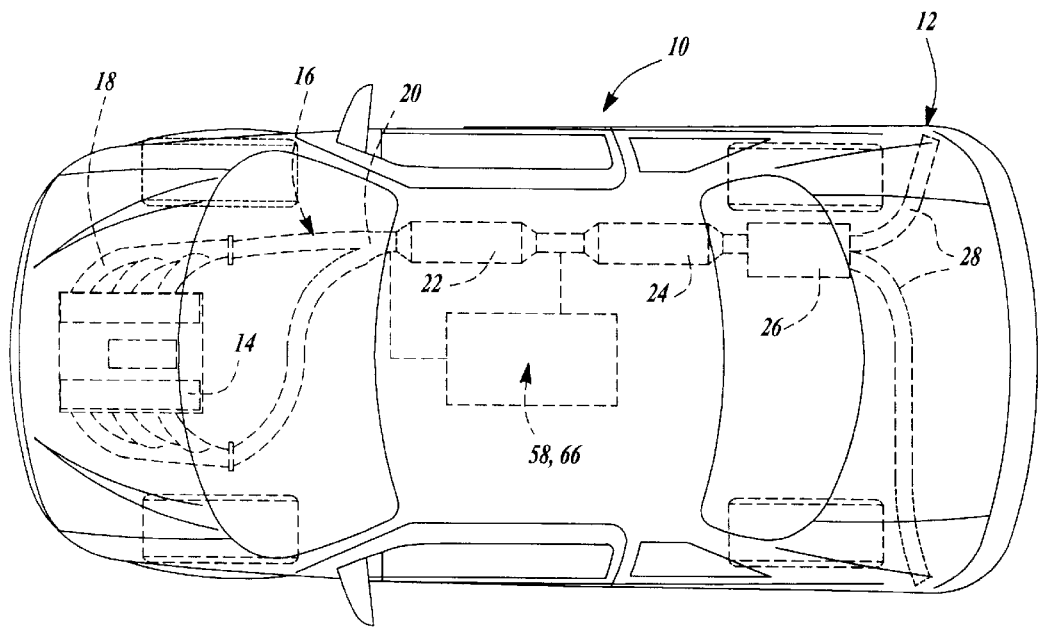
Figure 2:
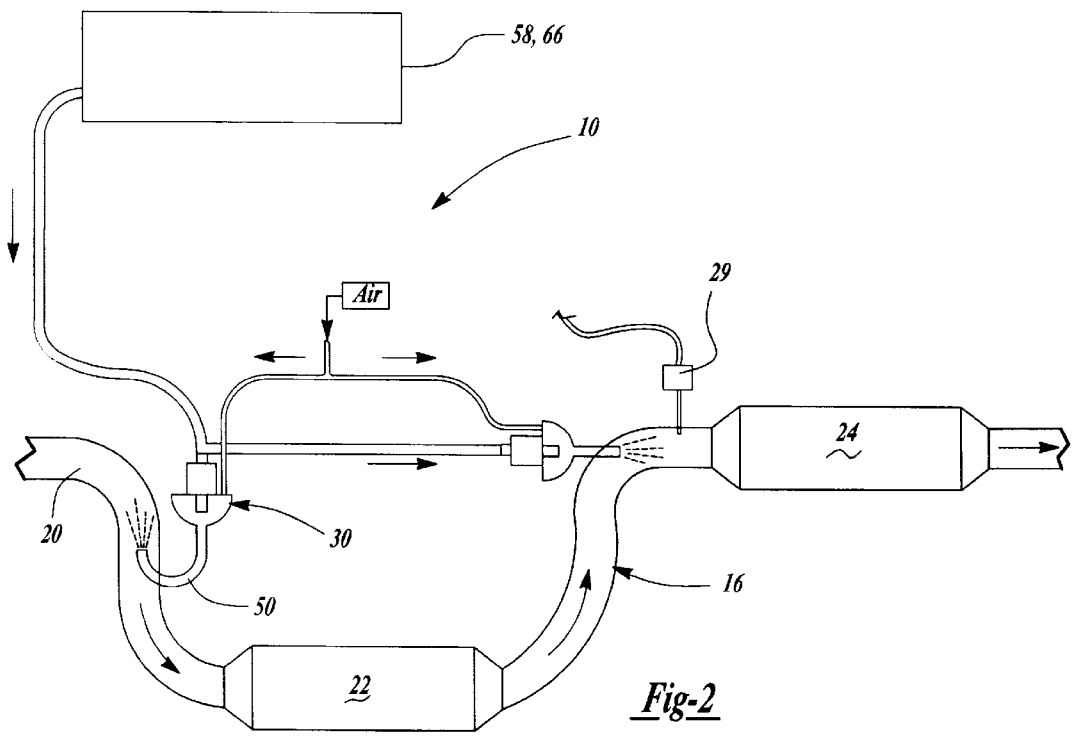
FIG. 2 is a schematic view of the on-board reductant delivery system of FIG. 1.

Referring to the drawings and in particular FIGS. 1 and 2, one embodiment of an on-board reductant delivery system 10, according to the present invention, is illustrated in operational relationship with a motor vehicle, generally indicated at 12. The motor vehicle 12 includes an engine 14 and an exhaust system, generally indicated at 16, connected to the engine 14. The exhaust system 16 includes an exhaust manifold 18 connected to the engine 14 and an exhaust pipe 20 extending from the exhaust manifold 18. The exhaust system 16 also includes at least one catalyst or catalytic converter, preferably a close coupled catalyst 22 and an underbody catalyst 24 connected to the exhaust pipe 20. The exhaust system 16 further includes a muffler 26 and tail pipe 28 extending from the underbody catalyst 24. The exhaust system 16 also includes an exhaust gas temperature sensor 29 connected to a controller. It should be appreciated that, except for the on-board reductant delivery system 10, the motor vehicle 12, engine 14 and exhaust system 16 are conventional and known in the art.

Figure 5:
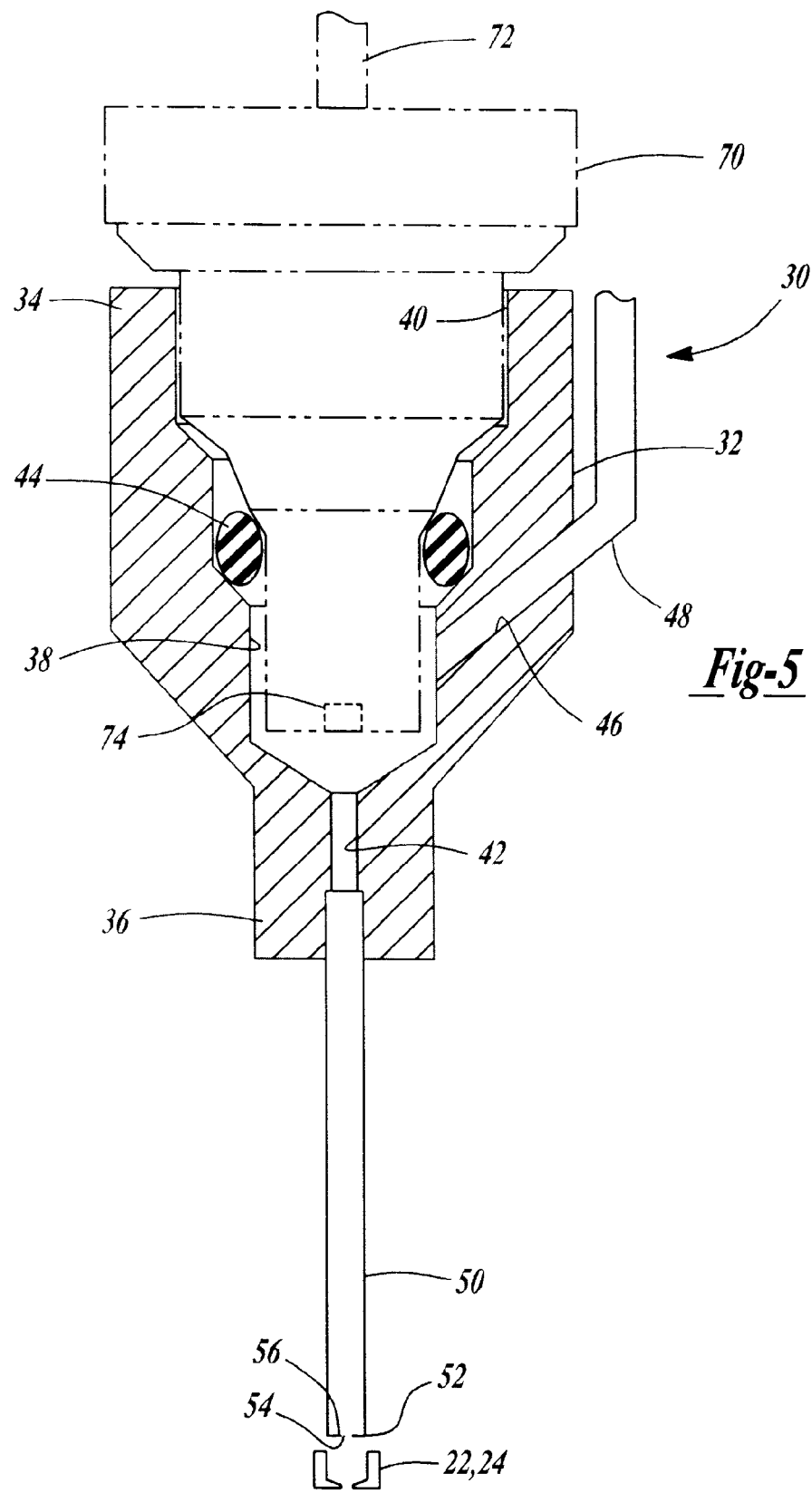
FIG. 5 is a fragmentary elevational view of a mixer/nozzle portion of the on-board reductant delivery system of FIGS. 1 through 4.

Referring to FIGS. 2, 3 and 5, the on-board reductant delivery system 10 includes a mixer/nozzle system, generally indicated at 30, to provide proper mixing of air and reductants and delivery to the exhaust system 16 in a fine mist. The mixer/nozzle system 30 includes a mixer 32 for mixing air and reductants together. The mixer 32 is generally cylindrical in shape and has a generally circular cross-sectional shape. The mixer 32 extends axially between an inlet end 34 and an outlet end 36. The mixer 32 has a mixing chamber or cavity 38 extending axially from the inlet end 34 with an inlet opening 40. The inlet opening 40 has a diameter greater than the remainder of the cavity 34. The inlet end 34 of the mixer 32 is attached to a metering device 70 to be described. The mixer 32 also includes a passageway 42 extending axially from the cavity 38 through the outlet end 36. The mixer 32 is made of a metal or plastic material. It should be appreciated that the mixer 32 has a small volume to allow the pre-mixing of air with reductant. It should also be appreciated that the mixer 32 is attached to vehicle structure by suitable means (not shown)

The mixer/nozzle system 30 includes a seal 44 disposed in the cavity 38 for engaging the metering device 70 to be described. The seal 44 is preferably an O-ring made of an elastomeric material to prevent reductants from exiting the cavity 38. The mixer/nozzle system 30 also includes a passageway 46 extending through a side thereof and communicating with the cavity 38. The passageway 46 is connected to a conduit 48 by suitable means such as silver soldering or welding. The conduit 48 is connected to an air supply system to be described.

The mixer/nozzle system 30 further includes a conduit 50 extending from the mixer 32. The conduit 50 has a relatively small inner diameter, less than 0.100 inches. The conduit 50 is a relatively thin walled tube made of a metal, plastic or teflon material. The conduit 50 has one end connected to the passageway 42 of the mixer 32 by suitable means such as silver soldering, welding or tube fitting. The conduit 50 is partially disposed in the exhaust pipe 20 to guide the flow of mixture from the mixer 32 and protect the metering device from contamination and overheating by exhaust gases from the engine 14. It should be appreciated that the conduit 50 minimizes transfer volume and reduces delay time.

The mixer/nozzle system 30 includes a nozzle 52 connected to the free end of the conduit 50, which protrudes inside the exhaust pipe 20 to disperse the reductants. The nozzle 52 is a small aperture 54, less than 0.040 inches, surrounded by a sharp edge 56, which provides a wide spray angle and effective fluid atomization with the aid of air. The nozzle 52 is made of one-piece. The nozzle 52 has an outer diameter approximately the same as the conduit 50 for easy installation.

The on-board reductant delivery system 10 also includes an air supply system, generally indicated at 58, connected to the mixer/nozzle system 30 to provide adequate pressure and flow of air to convey and disperse reductants. The air supply system 58 includes an air compressor 60 to provide pressurized air to the mixer 32 of the nozzle system 30. The air compressor 60 is connected to the conduit 48 by suitable means (not shown). The air compressor 60 can be any size, preferably small such as a Thomas, Model 010CDC-26/12C, providing that it is capable of supplying an adequate air flow at a given pressure such as a flow of four (4) to five (5) liters per minute (LPM) per nozzle at five (5) to six (6) pounds per square inch (psi) per nozzle. It should be appreciated that the air compressor 60 is conventional and known in the art.

The air supply system 58 also includes a pressure sensor or transducer 62 with one port connected to the conduit 48 to monitor the air pressure from the air compressor 60 and another port connected to the exhaust pipe 20 to provide a direct current (DC) signal to a pressure control circuit 64 to be described. The pressure transducer 62 is an absolute or differential pressure transducer such as a Motorola, Model MPX4250A, MPX5100O, or MPX 2100P. It should be appreciated that the pressure transducer 62 is conventional and known in the art.

The air supply system 58 further includes a pressure control circuit 64 electrically connected to the pressure transducer 62 and the air compressor 60. The pressure control circuit 64 controls a level of the air pressure from the air compressor 60 by regulating a motor speed of the air compressor 60 using a feedback loop and a pulse-width-modulation (PWM) method. The pressure control circuit 64 receives the DC signal from the pressure transducer 62 and compares it with a preset value stored in memory. If the DC signal is greater than the preset value, the pressure control circuit 64 will reduce the power to the motor of the air compressor 60 by reducing a pulse width of a supply voltage from the pressure control circuit 64 to the motor of the air compressor 60. Since the frequency of the pulses is very high, typically greater than one hundred hertz (>100 Hz), the net result is the reduction of the average supply voltage and current to the motor of the air compressor 60. If the DC signal is less than the preset value, the supply pulse width from the pressure control circuit 64 is increased. The pressure control circuit 64 is a modified control circuit such as a Quantum Control, QC4100. It should be appreciated that the pressure control circuit 64 is conventional and known in the art. It should also be appreciated that the air compressor 60, in most cases, is running at a constant but reduced speed and power compared with its specifications and the lifetime of the motor will increase considerably. It should further be appreciated that the air supply system 58 eliminates the need of an accumulator and a large compressor in order to pump the air up to five to ten times of the working pressure in a large accumulator. It should still further be appreciated that the pressure control circuit 64 maintains a constant pressure drop across the nozzle 52 to allow constant air mixture flow and atomization.

The on-board reductant delivery system 10 further includes a fluid metering system, generally indicated at 66, connected to the nozzle system 30 to measure and transfer exact quantity of reductants such as fuel or urea on demand. The fluid metering system 66 includes a reservoir 68 for reductant storage and refilling. If the reductant is fuel, the reservoir 68 is the fuel tank of the motor vehicle 12. If the reductant is urea, the reservoir 68 is a plastic container. The plastic container has a volume of two (2) to ten (10) liters (L). The fluid metering system 66 also includes a metering device 70 fluidly connected by a conduit 72 o the reservoir 68. The metering device 70 may be a fuel injector partially disposed in the cavity 38 of the mixer 32. The metering device 70 extends axially and engages the seal 44 and has an orifice 74 disposed near a bottom of the cavity 38. The metering device 70 operates as an On/Off valve. The metering device 70 is also electrically connected to a controller (not shown) for turning the metering device On and Off. It should be appreciated that the metering device 70 is conventional and known in the art.

The fluid metering system 66 includes an air pressure line 76 connected to the reservoir 68 and a source of air pressure (not shown). The source of air pressure supplies an air pressure in the air pressure line 76 in a range of twenty (20) to thirty (30) psi and is static. The fluid metering system 66 also includes a fill line 78 connected to the reservoir 68 and a check valve 80 on the fill line 78 to provide a pressure-tight system. The fill line 78 allows the reservoir to be filled with reductants and the check valve 80 prevents the air pressure from escaping through the fill line 78. It should be appreciated that by controlling the fluid pressure and duty cycle of the metering device 70, an accurate quantity of reductants can be measured and delivered. It should also be appreciated that the air pressure system 58 and fluid metering system 66 are secured to vehicle structure by suitable means (not shown).

In operation of the on-board reductant delivery system 10, the reservoir 68 is filled with reductants and is pressurized by air pressure through the air pressure line 72. The air compressor 60 is energized by the pressure control circuit 64 when the vehicle 12 is started and the engine 14 is running. The controller controls the metering device 70 by turning it On and Off to deliver reductants from the reservoir 68 via the conduit 72 to the mixer 32. The air compressor 60 delivers pressurized air to via the conduit 48 to the mixer 32. The reductants are mixed with the pressurized air in the cavity 38 of the mixer 32 and the mixture flows through the conduit 50 to the nozzle 52. The mixture is sprayed by the nozzle 52 into the exhaust gases upstream of the close coupled and underbody catalysts 22 and 24 to reduce NOx in the exhaust gases.

Referring to FIG. 4, another embodiment 110, according to the present invention, of the on-board reductant delivery system 10 is shown. Like parts of the on-board reductant delivery system 10 have like reference numerals increased by one hundred (100). The on-board reductant delivery system 110 includes the nozzle system 130, air supply system 158 and fuel metering system 166. In this embodiment, the air supply system 158 also includes a conduit 182 connected to the exhaust pipe 20 and pressure transducer 162 to measure the pressure of the exhaust gases. The pressure transducer 162 also measures the air pressure from the air compressor 160 and supplies both signals to the pressure control circuit 164. Further, the fluid metering system 166 includes the metering device 170 as a metering pump. The metering pump can be any positive displacement pump such as a piston pump, solenoid pump, screw or gear pump. The fluid metering system 166 eliminates fuel pressurization, thereby eliminating the use of an air pressure line to the reservoir 168 and a check valve on the fill line 178. It should be appreciated that by controlling speed of the metering pump, an exact quantity of reductants will be metered and transferred. It should also be appreciated that the delivered quantity of reductants is independent of the fluid viscosity over a wide temperature range. It should be appreciated that the operation of the on-board reductant delivery system 110 is similar to the on-board reductant delivery system 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An on-board reductant delivery system for a motor vehicle comprising:

a mixer/nozzle system for connection to an exhaust system of a motor vehicle, said mixer/nozzle system including a nozzle;

a fluid metering system connected to said mixer/nozzle system for metering reductants to said mixer/nozzle system; and an air supply system connected to said mixer/nozzle system for delivering pressurized air to said mixer/nozzle system and including a pressure sensor for sensing a pressure level from said air supply system and the exhaust system and a pressure control circuit connected to said pressure sensor for adjusting a pressure level from said air supply system to maintain a constant pressure differential across said nozzle, wherein said mixer/nozzle system mixes the reductants and pressurized air and sprays the mixture through said nozzle in the exhaust system of the motor vehicle to reduce NOx.

2. The on-board reductant delivery system as set forth in claim 1 wherein said fluid metering system includes a metering device connected to a source of reductants for metering reductants to said mixer/nozzle system.

3. The on-board reductant delivery system as set forth in claim 2 wherein said fluid metering system includes a reservoir connected to said metering device for containing the source of reductants.

4. The on-board reductant delivery system as set forth in claim 3 wherein said fluid metering system includes a fill line connected to said reservoir.

5. The on-board reductant delivery system as set forth in claim 4 wherein said fluid metering system includes a check valve on said fill line before said reservoir.

6. The on-board reductant delivery system as set forth in claim 3 wherein said fluid metering system includes an air pressure line connected to said reservoir to pressurize said reservoir.

7. The on-board reductant delivery system as set forth in claim 2 wherein said metering device comprises a fuel injector.

8. The on-board reductant delivery system as set forth in claim 2 wherein said metering device comprises a metering pump.

9. The on-board reductant delivery system as set forth in claim 1 wherein said mixer/nozzle system comprises a mixer having a mixing chamber and a nozzle.

10. An on-board reductant delivery system for a motor vehicle comprising:

a mixer/nozzle system for connection to an exhaust system of a motor vehicle, said mixer/nozzle system including a nozzle;

A fluid metering system connected to said mixer/nozzle system for metering reductants to said mixer/nozzle system;

an air supply system connected to said mixer/nozzle system for delivering pressurized air to said mixer/nozzle system;

wherein said mixer/nozzle system mixes the reductants and pressurized air and sprays the mixture in the exhaust system of the motor vehicle to reduce NOx; and wherein said air supply system comprises an air compressor connected to a source of power fand a pressure control circuit connected to said air compressor for adjusting a pressure level from said air compressor to maintain a constant pressure differential across said nozzle.

11. The on-board reductant delivery system as set forth in claim 2 wherein said air supply system includes a pressure sensor connected to said pressure control circuit for sensing the pressure level of air from said air compressor and the exhaust system.

12. An on-board reductant delivery system for a motor vehicle comprising:

a mixer/nozzle system for connection to an exhaust system of a motor vehicle, said mixer/nozzle system including a nozzle;

a fluid metering system connected to said mixer/nozzle system for metering reductants; and an air supply system connected to said mixer/nozzle system and including an air compressor for delivery pressurized air to said mixer/nozzle system and a pressure control circuit connected to said air compressor to allow said air compressor to operate at a variable speed to maintain a constant pressure differential across said nozzle, wherein said mixer/nozzle system mixes the reductants and pressurized air and sprays the mixture through said nozzle in the exhaust system of the motor vehicle to reduce NOx.

13. The on-board reductant delivery system as set forth in claim 12 wherein said air supply system includes a pressure sensor interconnecting said air compressor and said pressure control circuit for sensing a pressure level from said air compressor and the exhaust system.

14. The on-board reductant delivery system as set forth in claim 12 wherein said fluid metering system includes a metering device connected to a source of reductants for metering reductants to said mixer/nozzle system.

15. The on-board reductant delivery system as set forth in claim 14 wherein said fluid metering system includes a reservoir connected to said metering device for containing the source of reductants.

16. The on-board reductant delivery system as set forth in claim 14 wherein said metering device comprises a fuel injector.

17. The on-board reductant delivery system as set forth in claim 14 wherein said metering device comprises a metering pump.

18. The on-board reductant delivery system as set forth in claim 12 wherein said mixer/nozzle system includes a mixing chamber connected to said nozzle.

19. An on-board reductant delivery system for a motor vehicle comprising:

a mixer/nozzle system for connection to an exhaust system of a motor vehicle;

a fluid metering system connected to said mixer/nozzle system for metering reductants to said mixer/nozzle system and including an air compressor for delivery pressurized air to said mixer/nozzle system;

an air supply system connected to said mixer/nozzle system for delivering pressurized air to said mixer/nozzle system;

said mixer/nozzle system comprising a mixer having a mixing chamber to receive the reductant and pressurized air and form a mixture thereof and a passaway extending from said cavity for the mixture to exit said cavity, a conduit connected to said passageway to guide said mixture from said passageway, and a nozzle connected to said conduit and disposed within the exhaust system to spray the mixture in the exhaust system of the motor vehicle to reduce NOx; and said air supply system including an air compressor for delivering pressurized air to said mixing chamber and a pressure control circuit connected to said air compressor to allow said air compressor to maintain a constant pressure differential across said nozzle.

* * * * *